United States Patent [19]
Levy et al.

[11] 3,980,992
[45] Sept. 14, 1976

[54] MULTI-MICROPROCESSING UNIT ON A SINGLE SEMICONDUCTOR CHIP

[75] Inventors: Bernardo Navarro Levy, Ann Arbor, Mich.; David Chin-Chung Lee, San Diego, Calif.

[73] Assignee: Burroughs Corporation, Detroit, Mich.

[22] Filed: Nov. 26, 1974

[21] Appl. No.: 527,358

[52] U.S. Cl. .............................................. 340/172.5
[51] Int. Cl.² ........................ G06F 9/16; G06F 9/18
[58] Field of Search ...................... 340/172.5; 445/1

[56] References Cited
UNITED STATES PATENTS

| | | | |
|---|---|---|---|
| 3,597,641 | 8/1971 | Ayres | 340/172.5 |
| 3,641,511 | 2/1972 | Cricchi et al. | 340/173 R |
| 3,757,306 | 9/1973 | Boone | 340/172.5 |
| 3,758,761 | 9/1973 | Henrion | 340/172.5 |
| 3,786,436 | 1/1974 | Zelinski et al. | 340/172.5 |

*Primary Examiner*—Mark E. Nusbaum
*Attorney, Agent, or Firm*—Mervyn L. Young

[57] ABSTRACT

This disclosure relates to a multimicroprocessor unit which is adapted for implementation in a single MOS semiconductor chip, which unit includes a plurality of sets of registers where each set represents a different processing capability. The unit further includes common elements which are shared by the different sets of registers in a time multiplex manner. The shared elements include two scratch pad memories, an arithmetic logic unit, and a control unit which incorporates a composite read only memory from which control signals are fetched to initiate the respective data transfers and arithmetic operations. This control memory acts as a decoder for encoded microinstructions retrieved from outside of the multi-processor unit. In this sense, the present invention employs both vertical and horizontal microprogramming as those terms are conventionally defined. The different sets of dedicated registers are formed of 4-bit shift registers so as to permit a four-way time slicing among the processing capabilities.

10 Claims, 14 Drawing Figures

N (PAGE NO.)

FIG. 5A.

24-8 BIT REGISTERS

BYTE { 0, 2, 4, 6, 8, 10, 12, 14 }

BYTE { 0, 1, 2, 3 }

FIG. 5C.

| BYTE | B | | |
|---|---|---|---|
| 0 | 1 | 0 | |
| 2 | 3 | 2 | TRN |
| 4 | 5 | 4 | CAL0 |
| 6 | 7 | 6 | CAL1 |
| 8 | 9 | 8 | R/W0 |
| 10 | 11 | 10 | R/W1 |
| 12 | 13 | 12 | R/W2 |
| 14 | 15 | 14 | |

| BYTE | A | | |
|---|---|---|---|
| 0 | U | L | R/W0 |
| 1 | U | L | R/W1 TRN |
| 2 | U | L | R/W2 CAL0 |
| 3 | U | L | R/W3 CAL1 |

FIG. 10.

PROCESSOR 0
PROCESSOR 1
PROCESSOR 2
PROCESSOR 3

| NST | Cycles | X 76543210 | ALU 876543210 | IA ND K | S T 21A | I 32 | S E L S L T D T P CF X3 N B R | PC 3 2 1 | Y 3 2 1 0 | I N P | S H I/O IF | X |
|---|---|---|---|---|---|---|---|---|---|---|---|---|
| LPA | 1 | 1111BBBB | 1 | | 1 | | | | | | | |
| LDB | 1 | 1011BBBB | | | | | 1 | | | | | |
| ADD | 1 | 1001BBBB | 1 1 11 | | 1 | | | | | | | |
| XOD | 1 | 1101BBBB | 1 1 111 | | 1 | | | | | | | |
| ORD | 1 | 1100BBBB | 1 1 11 | | 1 | | | | | | | |
| AND | 1 | 1110BBBB | 1 1 | | 1 | | | | | | | |
| INC | 2 | 1010BBB0 | | 11Y₀ | 1 | | | Y₂ | Y₂ Y₂ | | | Y₂ |
| ADC | 2 | 1000BBB0 | 1 11 | | 1 | | | Y₂ | Y₂ Y₂ | | | Y₂ |
| LCA | 1 | 1010BBB1 | 1 1 | | 1 | | | | | | | |
| LCB | 1 | 1000BBB1 | | | | | 1 | | | | | |
| LDR | 1 | 0011RRRR | 1 1 | | 1 | | | | | | | |
| ADR | 1 | 0001RRRR | 1 11 11 | | 1 | | | | | | | |
| OUT | 2 | 0111CCCC | | | | | | 1 | 1 | 1 | | |
| IN | 2 | 0110CCC0 | | | | | | 1 | 1 1 | 1 | | |
| STO | ½ | 0110CCC1 | | | 1 | | | X₂ X₃ | X₂ X₃ | | 1 X₂ X₃ | |
| INA | 2 | 00000AA1 | 1 | 11Y₀ | 1 | 1 | | Y₂ | Y₂ Y₂ | | | Y₂ |
| RID | 3 | 00001AA1 | | | | 1 | | 1 | 1 1 1 | | | |
| WRT | 3 | 00001AA0 | | | | 1 | | 1 | 1 1 | | | |
| RDT | 2 | 000001A0 | | | | 1 | | 1 | 1 | | | |
| CAL | 2 | 000000A0 | | | 1 1 | | 1 | | 1 | | | |
| JAR | 2 | 0100AAAA | | | | | | | 1 | JA/N | | |
| JUP | 2 | 01010000 | | | | | | | 1 | 1 | | |
| JUK | 2 | 01010001 | | | | | | | 1 | 1 | | |
| JF | 2 | 01010010 | | | | | | | 1 | F | | |
| TRN | 3 | 01010011 | | | | | 1 | | 1 1 1 | | | |
| NOD | 1 | 01010100 | | | | | | | | | | 1 |
| CF | 1 | 01010101 | | | | | 1 | | | | | |
| STR | 1 | 01010110 | | | | | | | | | 1 | |
| ADK | 1 | 01010111 | | | | | | | 1 | | | |
| ADI | 1 | 01011011 | | | 1 | | | 1 | Y | | 1 | λ |
| LDN | 1 | 010111NN | | | | | 1 | | | | | |
| LPR | 1 | 0010PPPP | | | X1 N B R2 | 1 2 1 | | 3 2 1 0 | | 1/0 | | |
| 2 1 0 | | | | | | | | | | | | |
| 0 0 0 | 1 | - | | | | | | | | | | |
| 0 0 1 | 1 | 1 | | | | | | | | | | |
| 0 1 0 | 1 | 1 | | | | | | | | | | |
| 0 1 1 | 1 | 1 | 01 1 1 | | 1 | | | | | | | |
| 1 0 0 | 1 | 1 | | | | | | 1 | 1 | | | 1 |
| 1 0 1 | 1 | 1 | | | 1 | | X6 | X6 | | | | X6 |
| 1 1 0 | 1 | 1 | | | | | | | 1 | 1 | | |
| 1 1 1 | 1 | 1 | | | | | | | 1 1 | | | |
| 0 1 X | 1 | - | | | | | | 1 | 1 1 Y₀ | | | 1 |

MULTI-MICROPROCESSING UNIT ON A SINGLE SEMICONDUCTOR CHIP

BACKGROUND OF THE INVENTION

1. Field of the Invention

This invention relates to a microprogram multiprocessing system and in particular to such a multiprocessing system which resides in a single semiconductor chip.

2. Description of the Prior Art

Advances in the field of integrated circuits have led to an increase in the number of transistor gates which a circuit chip can accommodate from a very few up to hundreds and even in excess of a thousand gates. Such advance have made it possible to begin considering placing an entire small data processor on a single integrated circuit chip. This, in turn, provides the economic advantage of mass production in that, once the circuit masks for fabrication of the chip have been designed, the entire processor can be automatically manufactured much more cheaply than when a number of such chips are required to accommodate the processor, and certainly more cheaply than when a processor is formed of discrete components. A particular example of a small processor being placed on a single integrated circuit chip is illustrated in the Faber Patent Application No. 307,863, filed Nov. 20, 1972, now U.S. Pat. No. 3,878,514, which application is assigned to the assignee of the present application.

Smaller sized data processing system have many and are finding many more applications, not only as data concentrators, process controllers, and the like, but also as small data processing systems for many business and technical applications. In many instances, data processing requirements of a particular business will be a mix of accounting and billing tasks and also other processes which require larger computational capabilities. To meet this situation, intelligent terminals are provided which not only allow for time sharing of a larger computer but which are also capable of performing specific processing routines. Terminal processors can also perform various pre-processing tasks such as editing, formatting of data, etc.

A particular architectural concept that has allowed for more flexibility in computer design and particularly in regard to the design of mini computers and micro computers has been the concept of microprogramming or the employment of microinstructions to implement or interpret macroinstructions and instructions of higher level programming languages. Originally, microinstructions were considered to be just those sets of control bits required to activate various gates in a processor as might be required to carry out data transfer from one register to another and through the arithmetic and logic unit of the processor. These bits were stored in a small memory within the processor at locations which were addressed by the operation code of a macroinstruction. In this sense, the concept of microprogramming was that of replacing the macroinstruction decoder by a table look-up memory.

As initially defined, the microinstruction was a set of unpacked bits, each of which represented a control signal required to activate a gate, the set of control signals representing all gates required for activation to perform the function during one clock time as required by the macroinstruction operation code which was used to address the microinstruction memory. If the macroinstruction operation code required two or more clock times, then the operation code could be incremented by a counter so as to access the sequence of such microinstructions.

As the size of the microprogram processor became more complex, the length of the microinstruction became longer so as to accommodate the extra control bits required. This, in turn, required that the microinstruction memory within the processor had to be larger and, therefore, more expensive. In order to reduce the size of the microinstruction memory in more complex processors, the microinstructions were encoded as distinct from being a series of unpacked or uncoded bits. This, in turn, required that a microinstruction decoder be provided which was less complex than the macroinstruction decoder replaced by the microinstruction memory. Thus, there are really two types of microinstructions, one of which is an unpacked series of bits and one of which is a packed or encoded series of bits.

The concept of microprogramming has allowed the data processor to be programmed at a very basic level and thus provides more flexibility for the implementation or interpretation of many higher level program languages. However, the original concept of microprogramming was devised in order to simplify the engineering design and manufacture of data processors. The trend in design of data processors, particularly for mini computers and micro processors, has been to implement the processor in a few, or as indicated above, even one, MOS integrated circuit chips which processor employes microinstruction memories. However, the size of the data processor in the range of the mini computer field is still limited by the number of transistor gates that can be placed on the MOS integrated circuit chip. Thus, larger size computers still must employ an extra number of integrated circuit chips with a consequential increase in manufacturing cost of the system since the plurality of different chips have to be designed and fabricated. In some systems, increased data through-put can be achieved where a plurality of small processors, each on an individual semiconductor chip, are coupled together in a multiprocessing mode. However, even then, data transfer between the chips takes an extra number of cycle times and the resultant system is not as fast as if a larger processor could be fabricated on a single chip.

It is, then, an object of the present invention to provide an improved data processing system on a single integrated circuit chip, which system has increased operating capabilities with a minimized manufacturing cost;

it is still another object of the present invention to provide a multiprocessing microprogrammed system on a single integrated circuit chip; and it is a further object of the present invention to provide a multiprocessing microprogrammed system with a plurality of processing capabilities sharing common elements of the system.

SUMMARY OF THE INVENTION

In order to accommodate more than one processing capability on a single MOS integrated circuit chip having a limited number of transistor gates, the present invention is directed toward plural sets of registers, each set representing a different processing capability, which registers share a common logic unit, control unit, and buses. The control unit includes a microprogram memory which is shared by the respective sets of processor registers and controls data transfer between individual ones of the registers in each particular set and with the logic unit. Such data transfers are under control of a clock with the respective sets of processor registers being accessed in a sequential time slice or multiplexing type mode with the respective sets of registers being activated by the clock in a successive manner.

A particular advantage of the present invention having a plurality of concurrent microprocessing capabilities is that processing capabilities have free communication with each other at different levels. One level of communication is through the interconnections provided between the processing capabilities the integrated circuit chip. Communication may also be obtained through the local scratch pad memory which is shared by the respective processing capabilities, and the respective processors can also communicate through main memory. Furthermore, an additional advantage is provided by the sharing of the same microprogram memory with all processing capabilities.

A feature, then, of the present invention resides in a multi-microprocessing system having a plurality of sets of registers, each set representing an individual processing capability, and a common logic unit, microprogram control memory, buses, and scratch pad memory shared by the respective processor registers.

DESCRIPTION OF THE DRAWINGS

The above objects, advantages, and features of the present invention will become more readily apparent from the following specification when taken in conjunction with the drawings wherein.

GENERAL DESCRIPTION OF THE INVENTION

Figure 1:
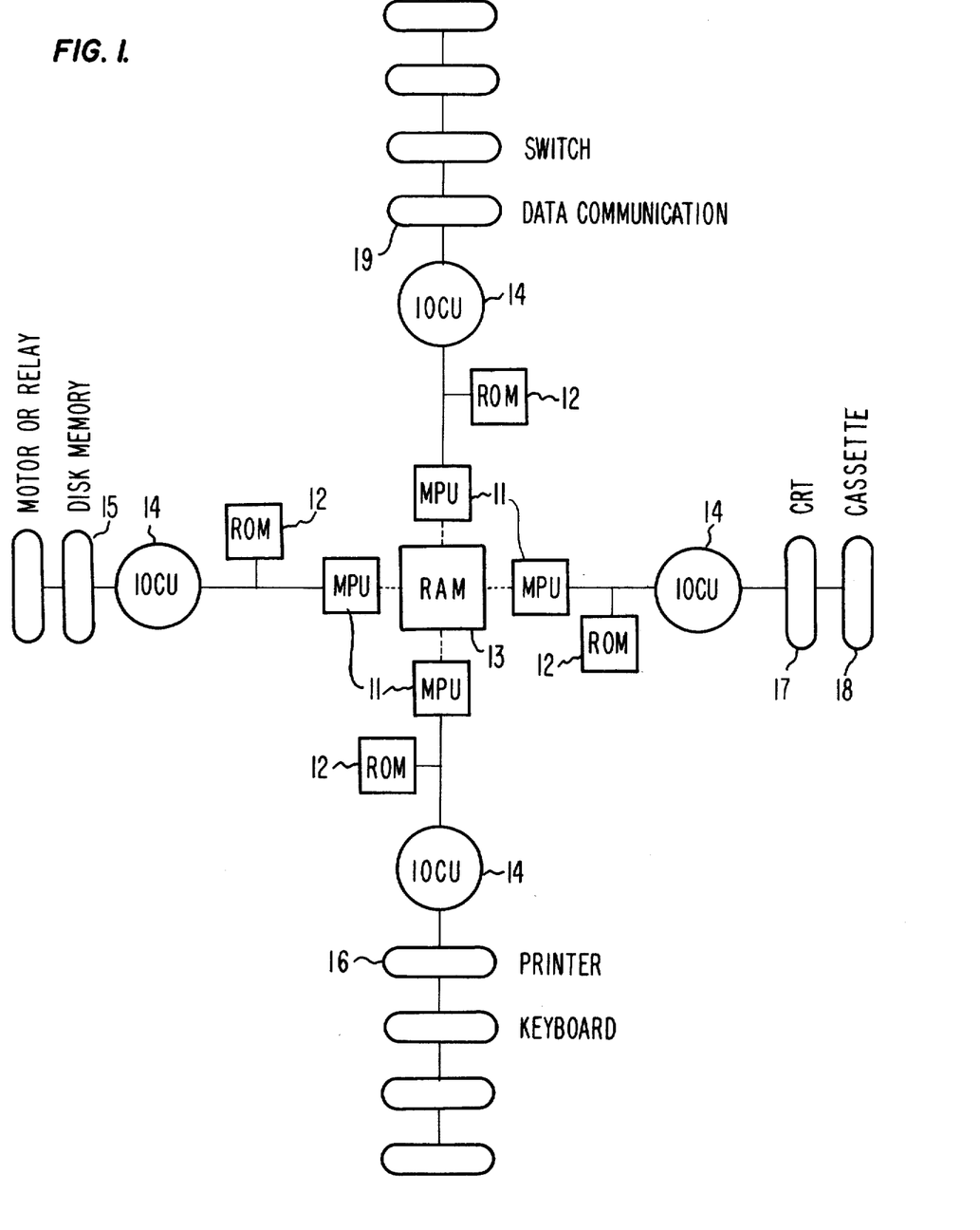
FIG. 1 is a representation of a system employing four multiprocessing units of the present invention.

The organization of the system employed in the present invention is illustrated in FIG. 1 wherein a plurality of MOS integrated circuit chips are coupled in a configuration to form a flexible multiprocessing system. The system of FIG. 1 includes a plurality of multiprocessing units (MPU) 11, which are coupled to random access memory (RAM) 13 which is provided for the storage of data and other information. Each MPU 11 is microprogrammed and to this end is coupled to a respective read only memory (ROM) 12. As indicated in FIG. 1, a variety of peripheral devices may be employed by the system under control of the various MPU's which devices include disk memory 15, printer 16, cathode ray tube display 17, cassette drive 18, and data communication unit 19.

Figure 2:
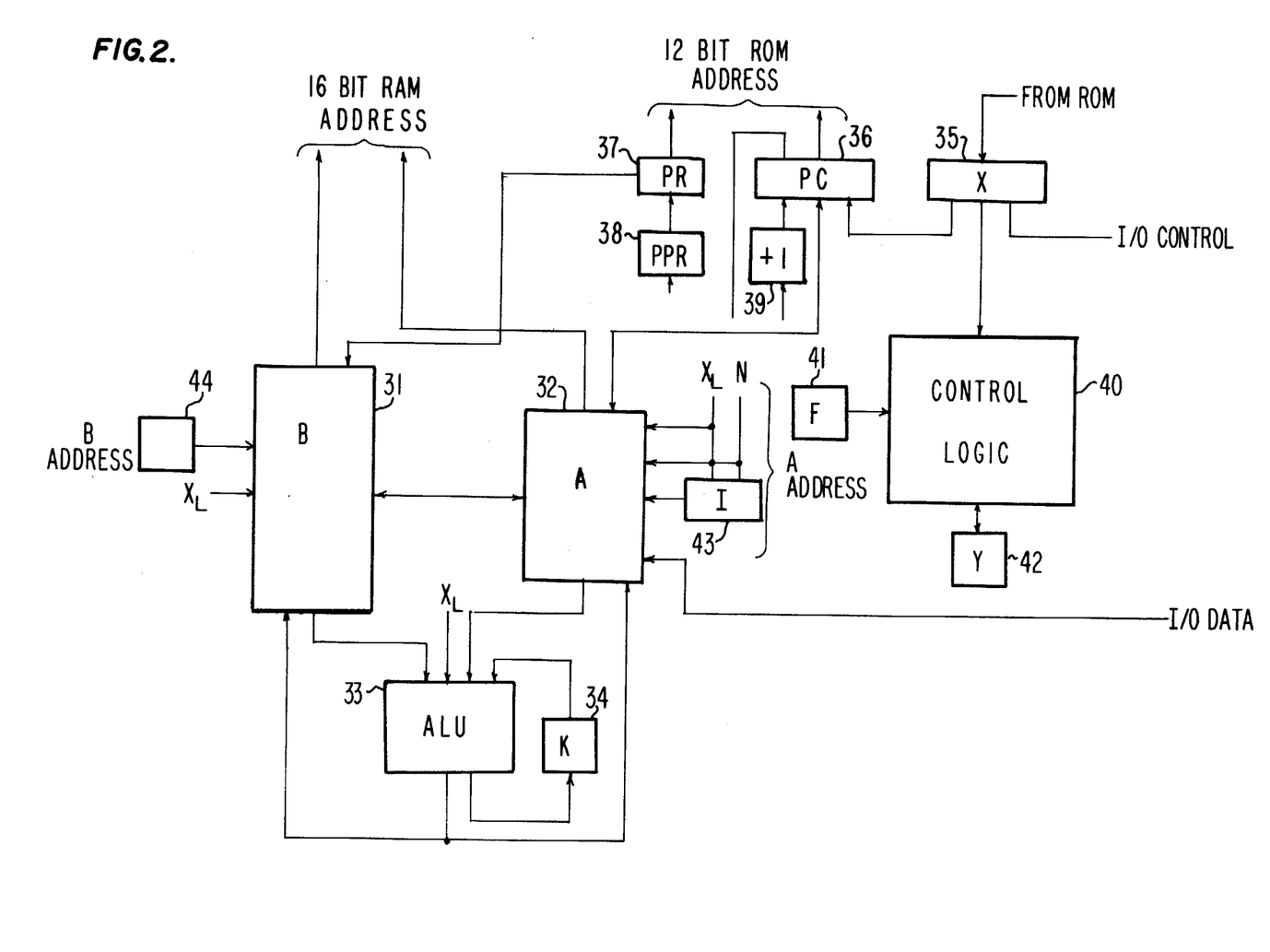
FIG. 2 is a functional representation of the units of the multiprocessing unit of the present invention.

Before the detail circuitry of the MPU is described, a description will first be given of the functional units employed by each processing capability in the multiprocessing system during that time slice when the individual processing capability has access to the shared resources in the system. A functional diagram of the processor with its unique and shared resources is illustrated in FIG. 2. The shared resources include the B scratch pad memory 31 and A scratch pad memory 32, the arithmetic logic unit (ALU) 33, control logic 40, and F register 41. The resources with which each processor is separately provided include X register 35, microprogram counter (PC) register 36, page (PR) register 37, and prepage (PPR) register 38, I register 43, N register 44, K register 34, and Y register 42.

The unique registers of the processor will now be described in relation to FIG. 2. In order for these special purpose registers to be dedicated to specific processing capabilities, they are formed out of 4-bit shift registers so as to permit four-way time slicing among the processing capabilities.

X register 35 is an 8-bit instruction register used to hold microinstructions during instruction decode and execution time. PC register 36 is an 8-bit microprogram counter register. This register holds the byte-within-page address of the next microinstruction to be executed. PR register 37 is a 4-bit microprogram counter page register. This register holds the page address of the next microinstruction to be executed.

PPR register 38 is a 4-bit prepage register. A jump out-of-page operation requires two instructions: a load page register instruction and a jump instruction. PPR register 38 is used to hold the new page number while the jump instruction is being fetched. The contents of the PPR register are loaded into the PR register only if the next instruction results in a jump. In all other cases, the load page register instruction behaves as a no operation. Thus, a conditional jump out-of-page operation remains in the same page if the condition is not satisfied.

I register 43 is a 4-bit register used to address the A scratch pad memory. N register 44 is a 2-bit register to address one of four pages in the B scratch pad memory. It is used in conjunction with part of the instruction to address a register in the B scratch pad memory. This register is also used to load I register 43.

K register 34 is a 1-bit register which is set or cleared only during add instructions. It may be used as an input to the ALU and can be tested by jump-on-carry instruction. Y register 42 is a 4-bit state machine register. This register is used to store the state of each processing capability during the time the other processing capabilities are executing. This is necessary since several instructions require more than one clock for execution.

The shared elements will now be described. ALU 33 is a 4-bit arithmetic and logic unit capable of performing binary addition, and bit-by-bit logical AND, OR, and EXCLUSIVE OR operations. Each operation is performed during a one clock time slice where byte operations require two passes through the ALU. A scratch pad memory 32 contains 16 registers, each register being 8-bits in width, which registers can be used as general purpose registers or for special purposes. The sixteen registers are divided into four pages of four registers each. When used for special purposes, the A registers are used in conjunction with B registers. The special purposes for which the registers can be used are discussed below.

B scratch pad memory 31 contains 24 registers of 8 bits each or it may be considered as 48 registers of 4 bits each, which registers may be used as general purpose storage registers, or in conjunction with A registers 32 as special purpose registers. The special purposes for which these registers may be used are described below.

Control logic 40 includes a composite read only memory and control logic which sequences operations of the system at the control signal level. F register 41 is a single flip-flop which is intended as a flag. It can be used by one processing capability or to communicate between processing capabilities.

Figure 5A:
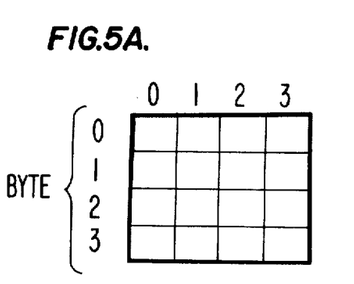
FIGS. 5A, 5B, and 5C, respectively, illustrate the organization of the A and B scratch pad memories.
Figure 5B:
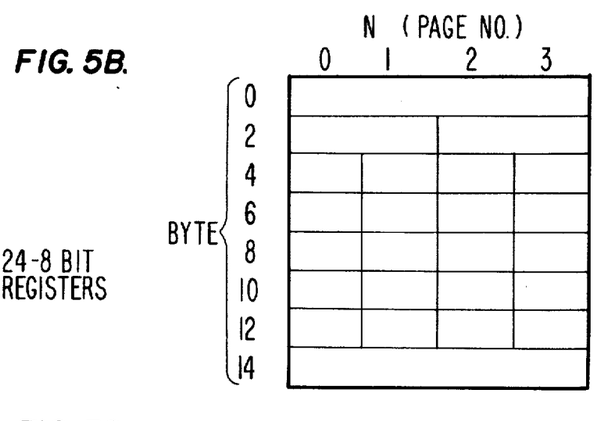

FIG. 5A illustrates the organization of A registers 32 and FIG. 5B illustrates the organization of B registers 31. Each processing capability is capable of accessing each of the 16 A registers or 24 B registers. However, to prevent one processing capability from destroying data of another processing capability, it is necessary to partition the A and B registers so that each processing capability has its own unique set. This partitioning should be done before any of the processing capabilities are microprogrammed.

Exactly how the partitioning should be done, of course, depends upon the tasks each processing capability is to perform. In general, the partition of allocating one page per processing capability reduces coding when the four processing capabilities are to execute similar tasks. In cases where one or two of the processing capabilities are to execute more complicated tasks than the others, it may be desirable to unevenly partition the registers to the complex tasks. This is especially true if by allocating more scratch pad locations to the tasks, fewer accesses to the random access memory are necessary.

The B scratch pad memory, like the A scratch pad memory, consists of four pages. Generally, each processor is allocated one page of B registers. The page number which is to be used by a processor is stored in its 2-bit N register. Addressing within a page is done in two ways: by byte and by digit. Byte addresses are the even numbers zero through 14. Digit addresses are the numbers zero through 15. These addresses access the same data: byte zero is the same register as digits zero and one; byte two is the same as digits two and three; and so forth.

As can be seen from FIG. 5B, the addressing space of the B scratch pad memory consists of 32 bytes or 64 digits. For two reasons, however, this done not match the physical size of the B scratch pad memory. There is not enough space on the integrated circuit chip for 32 bytes and inter-processing capability communications is enhanced by sharing physical registers. FIG. 5B illustrates how the registers are shared. As shown therein, each rectangle, regardless of size, represents one physical 8-bit register.

If it is assumed that each of the four processing capabilities uses a different value for N (B scratch pad page) then it is apparent that byte zero and 14 are shared by all processing capabilities and that one copy of byte two register is shared between processing capability zero and one and the other copy is shared between processing capabilities two and three. It is this sharing that allows data to be passed between processing capabilities without requiring a change in the value of N. It should be noted that since each processor can change the value of its N register, it can communicate to other processors through any of the A or B registers. By using the shared registers (byte zero, two, and 14), communication is accomplished without need to temporarily change the setting of N. In partitioning the B scratch pad memory between processors, a shared register can be assigned only to one processor unless it is used for communication.

As indicated above, one of the advantages of the present invention is that the four processors can share single copies of microprograms, either subroutines or full programs, and can be run concurrently. This is accomplished by first setting different values in the N registers for each of the processors and then having each processor jump to the same location in the read only memory. Programs written this way, however, cannot use any shared B register.

The special purposes for which the elements of A and B scratch pad memories are used to store 16-bit random access memory addresses, microprogram subroutine addresses, and microprogram memory read addresses. The elements of both scratch pad memories are concatenated for these purposes. For example, four pages of the A scratch pad memory and four pages of the B scratch pad memory can be grouped together, page zero of A with page zero of B, page one of A with page one of B, and so forth. Groups of pages for only one such group are shown in FIG. 5C since all the groups of pages function in an identical manner.

Figure 5C:
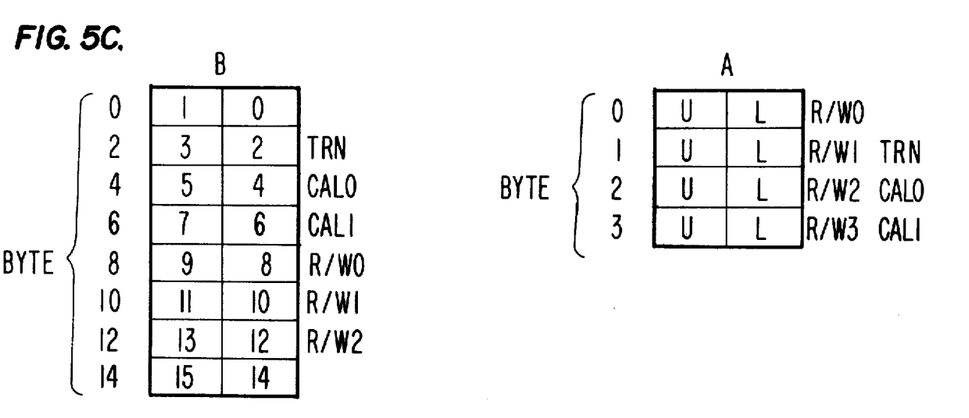

As illustrated in FIG. 5C, each group of pages has four random access memory read/write address registers. The first three of these, as indicated by R/W0, R/W1, R/W2, concatenate the following registers: B8 and A0, B10 and A1, and B12 and A2, so as to form three 16-bit random access memory registers for reading and writing data into the random access memory. In each case, the B byte is the most significant part of the address. The fourth address register, indicated by R/W3, concatenates A3 with all ones to form a "direct" addressing page in the random access memory, the upper most page.

Microprogram memory (ROM) addresses are all 12 bits long and are formed by concatenation of an 8-bit A register and the lower four bits (an even numbered digit address) of a B register. Three such ROM address registers are included in each pair of A and B pages. One of these concatenates digit B2 with A1 to form the ROM address register. This combination is used to translate data. A table of codes is stored in the ROM and translation is performed simply by placing the input code in B2 and A1 and reading the ROM.

The other two 12-bit ROM address registers are used to store return addresses after a microprogram subroutine jump instruction is executed. The return page number is stored in the B digit registers and the address within a page is stored in the A registers in the combination A2 along with B4 and A3 along with B6. It is obvious that two levels of subroutines can be handled very satisfactorily.

A description of the interfaces between the multiprocessing unit of the present invention and the periphery of the system in which it resides will now be described with reference to FIG. 3. As shown therein, the various interfaces include data bus 20 which is 8-bits wide, address bus 21 and various control lines. It will be remembered from the description of the system in FIG. 2 that a 16-bit address is required to address random access memory 13 while a 12-bit address is required to address read only memory 12. A 4-bit address is required for the input/output decoder 14A which in turn selects a peripheral device either by way of output logic 14B or input logic 14C, depending upon whether the data transmission to the periphery is called for to be an output transmission or an input transmission, respectively. Input transmission to data bus 20 is by way of transmission gates 28 when an input/output signal is transmitted from the multiprocessing unit and there is not a write signal present at the same time.

System instruction and data transfer from random access memory 13 occurs by way of data bus 20 when there is no write signal but there is a memory signal and a 16-bit address is presented to the random access memory 13. Microinstruction transfer from read only memory 12 occurs when there is no memory signal present, no input/output signal present and the 12-bit address is transmitted to the read only memory 12.

DETAILED DESCRIPTION OF THE INVENTION

Figures 4, 4A:
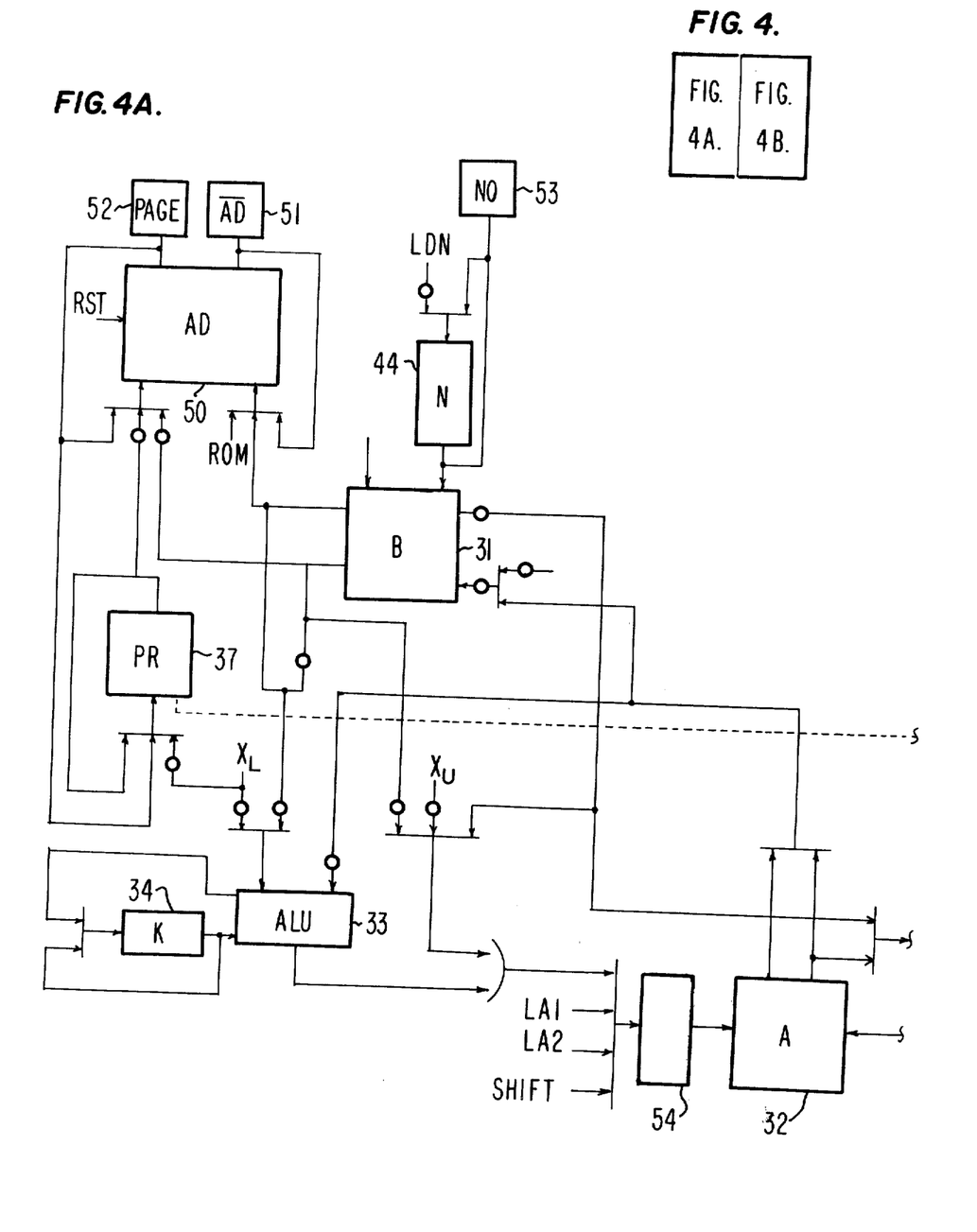
FIG. 4 illustrates the relation of FIGS. 4A and 4B.
FIGS. 4A and 4B are detailed schematic diagrams of the circuitry of the present invention.
Figure 4B:
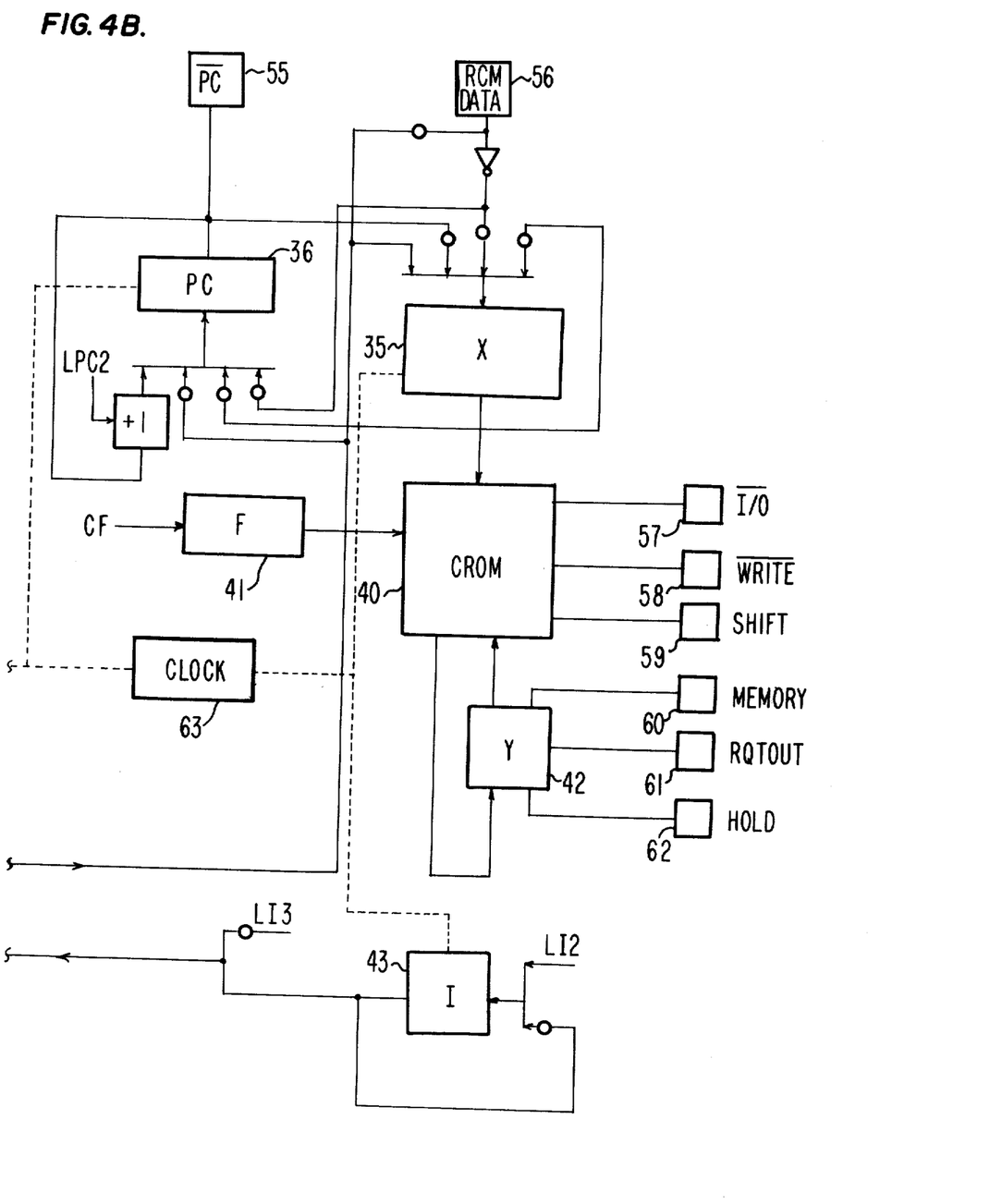

A detailed description of the present invention will now be provided with reference to FIGS. 4A and 4B, which are to be viewed together according to the relation illustrated in FIG. 4. The functional units in FIGS. 4A and 4B were generally described in relation to FIG. 2. It will be remembered from discussion of FIG. 2 that the present invention comprises plural sets of registers, each set of which is unique and representative of an individual processing capability and also shared elements which are commonly available to the unique sets of registers in a time multiplex manner so that in any given clock time, one of the processors thus formed is capable of functioning.

In FIG. 4A, B scratch pad memory 31 comprises 24 registers each of which are 8-bits wide, while A scratch pad memory 32 includes 16 registers each of which is 8-bits wide. ALU 33 is a 4-bit arithmetic logic unit while K register 34 is a 4-bit register which is accessed a bit at a time. It will be remembered that the K register is one of the registers that is unique to each processing capability. Thus, there can be up to four carry bits in the K registers, one such bit for each processing capability. PR register 37 includes four registers of 4-bits each. Again, it will be remembered that there is a unique PR register for each processing capability.

Address register 50 includes eight registers of 4-bits each which registers are used to transmit the upper 8-bit addresses to the random access memory. The reason for this organization of the address register 50 is that the data paths to and from address register 50 comprise two buses each of which is 4-bits wide.

Register 54 is an 8-bit register to supply data to A scratch pad memory 32. N register 44 includes four registers of 2-bits each. It will be remembered that the unique 2-bit N register is provided for each processing capability in the system.

In FIG. 4B, X register 35 and PC register 36 both include four registers of 8-bits each, each particular register being assigned to a particular processing capability. Similarly, I register 43 and Y register 42 contain four registers of 4-bits each with each register being assigned a particular processor.

Figure 3:
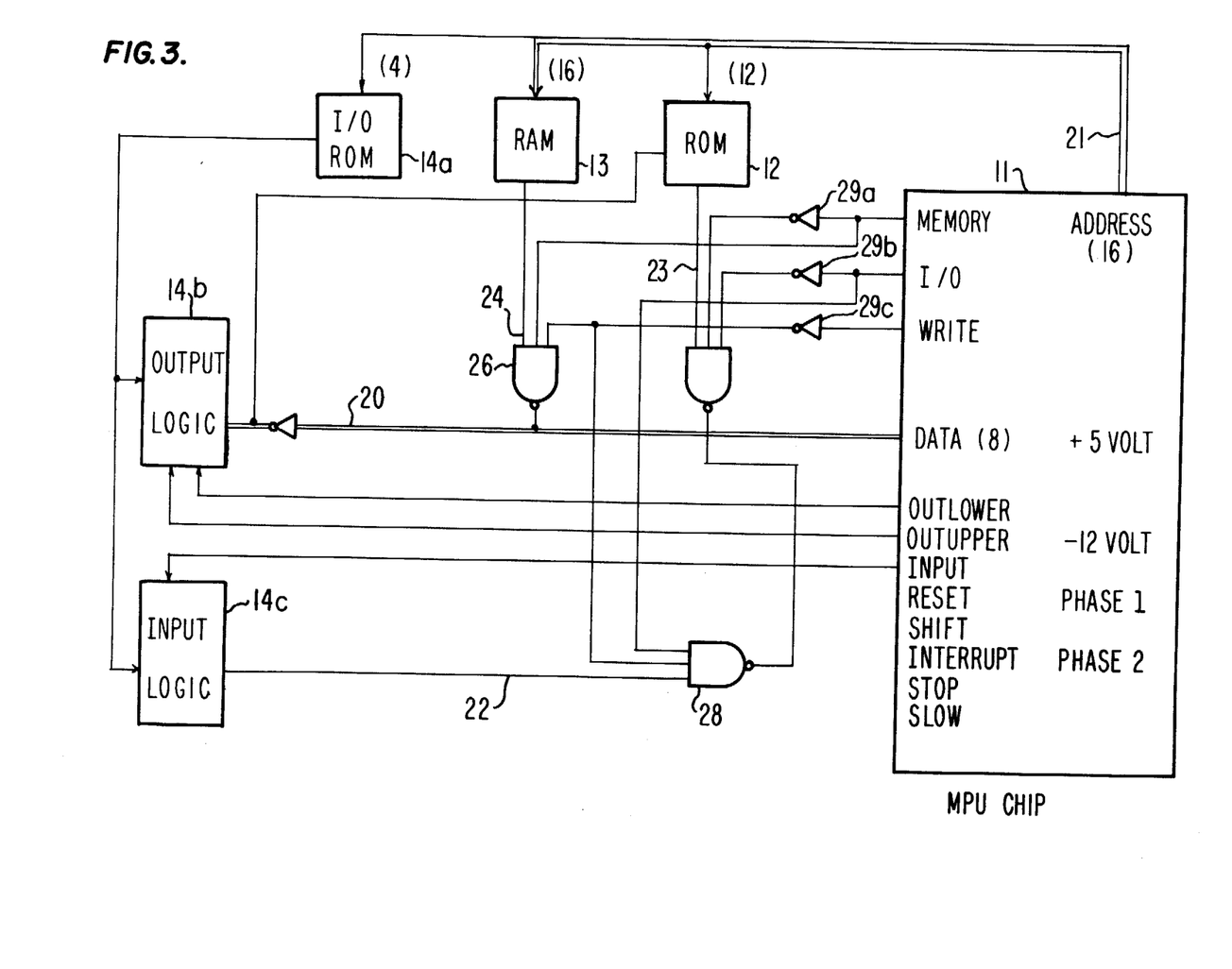
FIG. 3 is a schematic diagram of the interfaces which connect to the multiprocessing unit of the present invention.

The heart of the control logic 40 is a composite read only memory which may be a 51 by 29 MOS device matrix that can be reprogrammed to change the control signal sets which, in turn, are employed to decode microinstructions received in a particular processing capability's X register 35 from external read only memory 12 (see FIG. 3). F register 41 is a 1-bit flip-flop register that was described in relation to FIG. 2.

As illustrated in FIG. 4B, the signals required for memory access and input/output operations are generated directly by the composite read only memory and by the status of the respective Y registers 42 which store the state of each processing capability during the time that the other processing capabilities are executing. The signals which initiate a function of the arithmetic logic unit and data transfers between registers are also generated directly by the composite read only memory.

Figure 6:
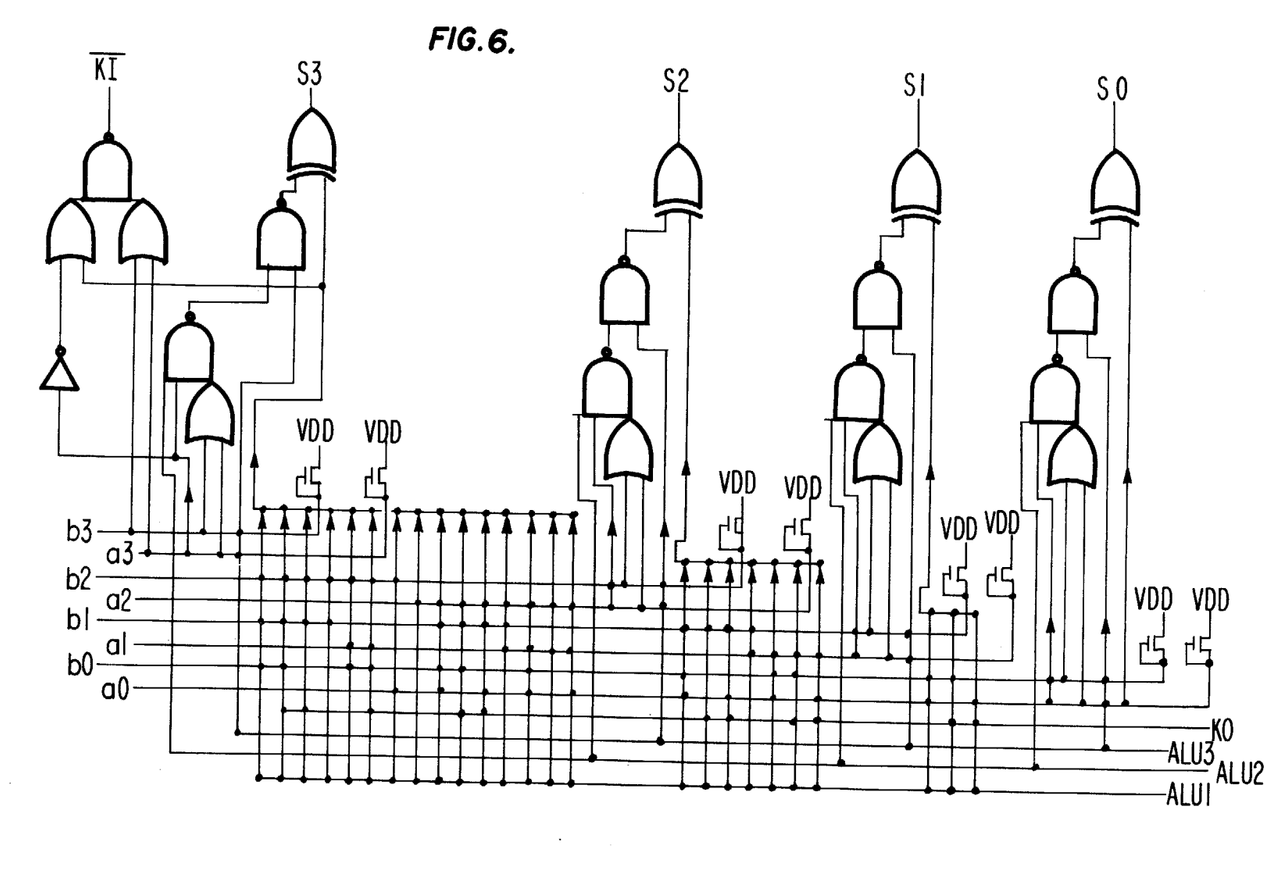
FIG. 6 is a schematic diagram of the arithmetic logic unit of the present invention.

FIG. 6 is a schematic diagram of the arithmetic logic unit (ALU) 33 of FIGS. 2 and 4A. The ALU is a four-bit adder that performs the functions AND, EXCLUSIVE OR, and ADD. As illustrated in FIG. 6, the ALU is formed of 4 stages to provide the ALU output signals S0, S1, S2, and S3 plus a carry signal Kl. Each of the stages is powered by a set of voltage sources VDD. The input signals to the ALU are the data sets a0, a1, a2, a3, and b0, b1, b2, b3 plus an initial carry signal K0. The control signals ALU1, ALU2, and ALU3 are received from control logic 40 of FIGS. 2 and 4B. Control signal ALU3 causes the ALU to perform the AND function. Control signal ALU2 causes the ALU to perform the EXCLUSIVE OR function. Control signal ALU3 causes the ALU to perform the EXCLUSIVE OR function with the carry signal K0 and the EXCLUSIVE OR product of the a and b input signals. Thus, the combination of control signals ALU2 and ALU3 causes the ALU to perform the ADD function on the respective input signals.

As has been indicated above, the respective unique registers of FIGS. 2, 4A, and 4B are four-bit shift registers so as to accommodate four-way time slicing or time sharing of the common elements of the system, i.e., ALU 33, control logic 40 and so forth as was discussed in relation to FIG. 2. An example of such shift registers is provided by FIG. 7 which is a schematic diagram of Y registers 42 and also K registers 34 of FIGS. 2, 4A, and 4B. These registers may be considered as four four-bit shift registers Y0, Y1, Y2, and Y3 (plus the K shift register) or they may be considered as four parallel registers YT0, YT1, YT3, and YT4 through which data is sequenced in synchronization with the time slicing or sharing of the common elements of the system by the four (albeit virtual) processing capabilities formed by the system.

Figure 7:
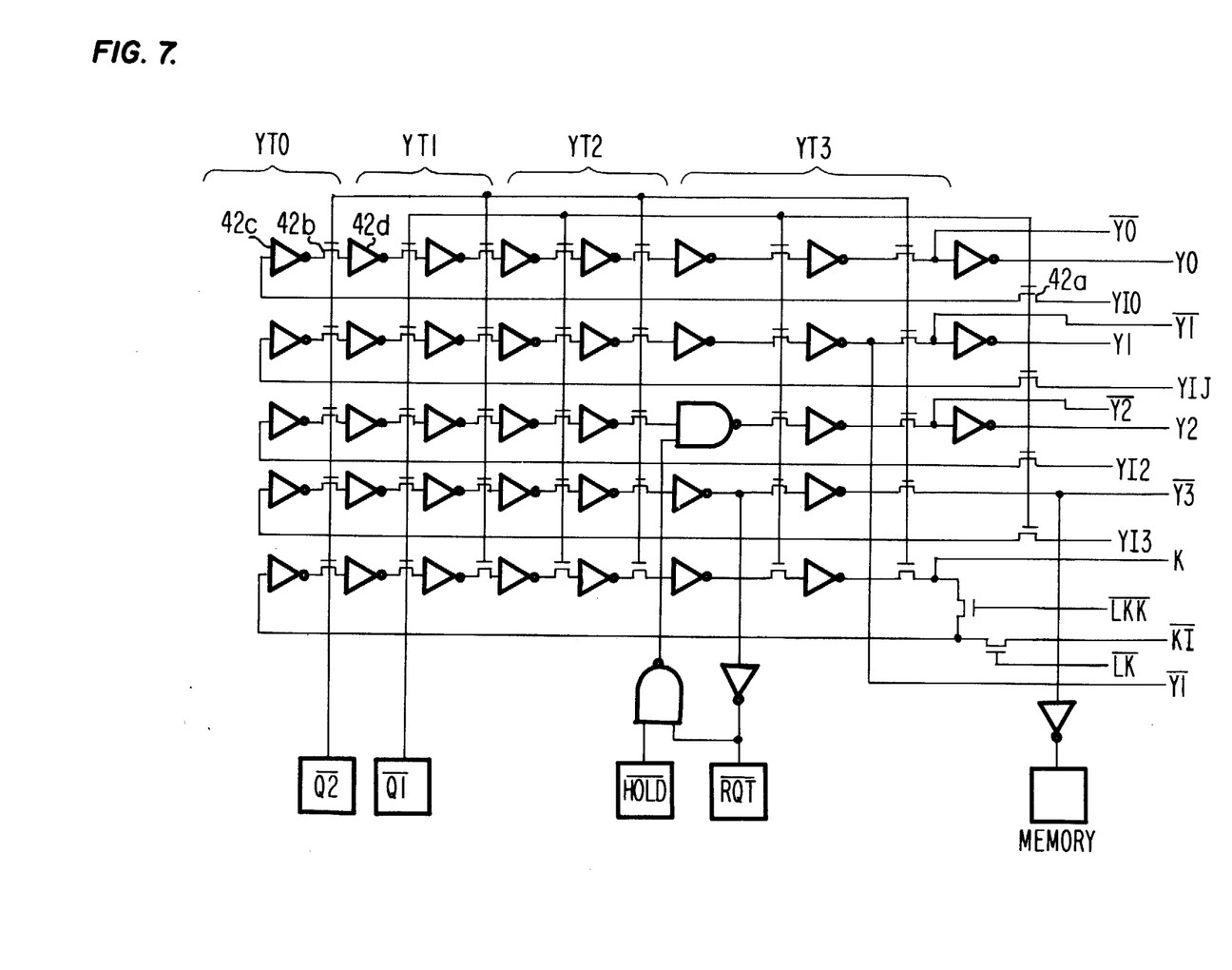
FIG. 7 is a schematic diagram of a set of shift registers as employed with the present invention.

Each bit position of the respective registers is formed of two cells which are sequentially driven by phase clock signals Q1 and Q2, respectively. As illustrated in FIG. 7, a typical cell is formed of FET (field effect transistor) gates 42a and 42b and inverter amplifiers 42c and 42d which are just individual transistors in the integrated circuit chip. During clock phase Q1, gate 42a of register YT0 (and also registers YT1, YT2, and YT3) is activated to receive an input signal YT0. During clock phase Q2, gate 42b is activated to receive that signal from gate 42a which is then free to receive a new input signal during the next clock phase Q1.

Figure 9:
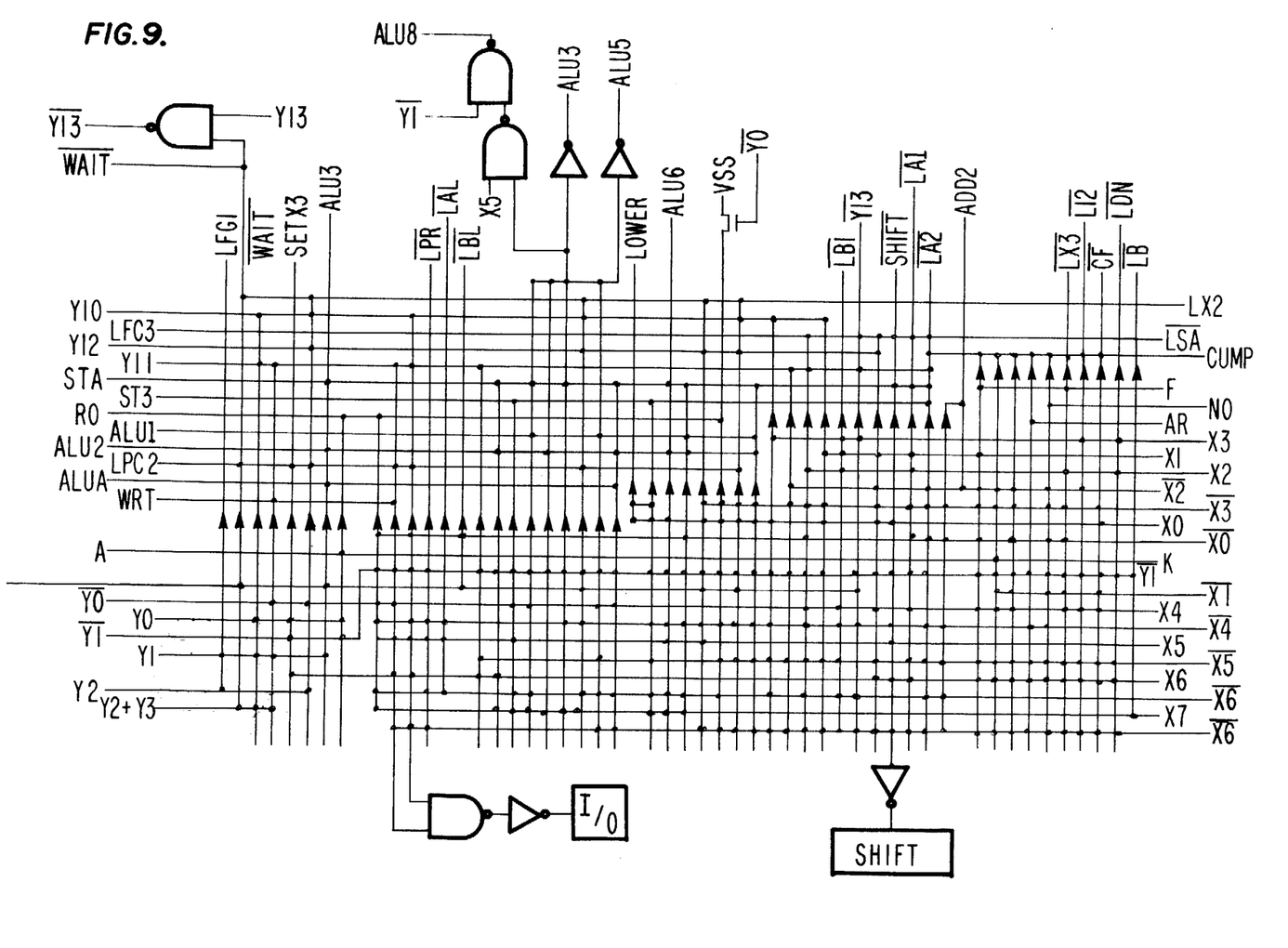
FIG. 9 is a schematic diagram of the control unit of the present invention.
Figure 10:
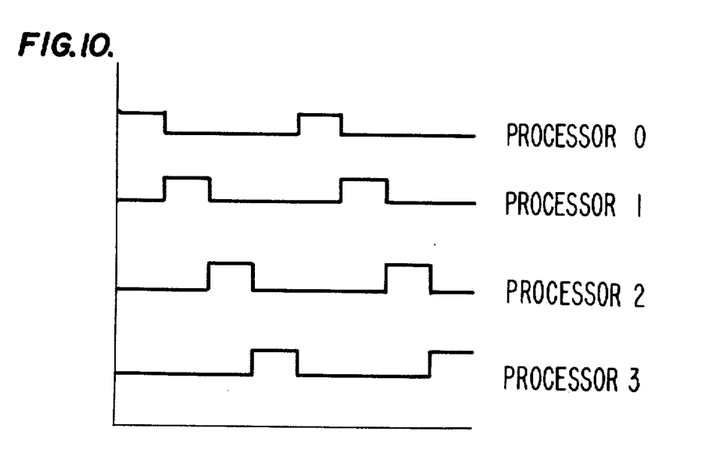
FIG. 10 is a set of wave forms illustrating the time multiplexing of common elements among the various processing capabilities of the present invention.

FIG. 9 is a schematic diagram of the control matrix of control logic 40 of FIGS. 2 and 4B. This matrix is employed to decode the respective microinstructions when they reside in X register 35 of FIGS. 2 and 4B.

This matrix may be reprogrammed by connecting and disconnecting the various nodes of the matrix so that it is equivalent to a control memory and may be replaced by such.

Figure 8:
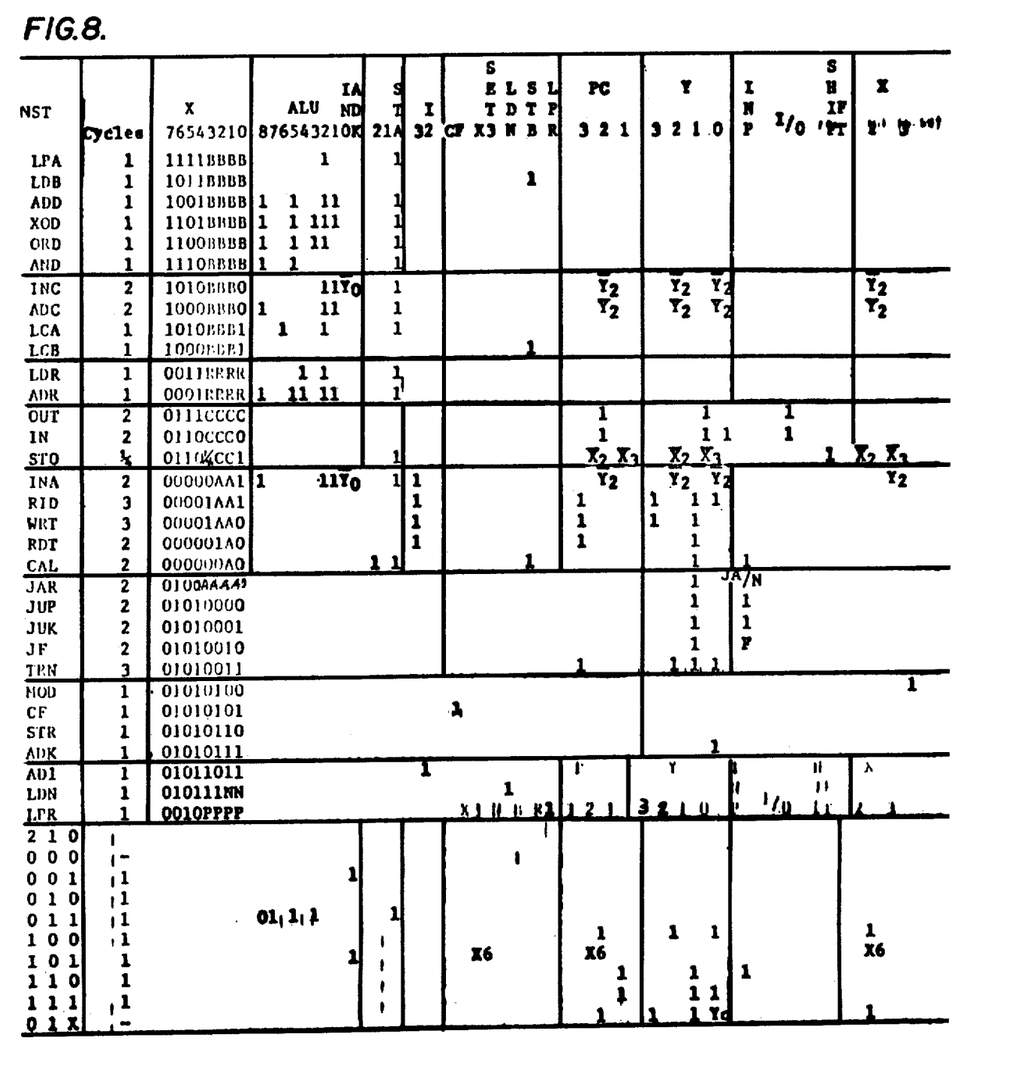
FIG. 8 represents tables illustrating the function performed by the various microinstructions employed by the present invention.

The relation between these respective control signals to be generated and the respective microinstructions residing in the X register during execution is illustrated in detail in FIG. 8. The table in FIG. 8 will not be discussed in detail; however, the functions as indicated therein will now be discussed for each microinstruction in the instruction set. In the following discussion, alphabetic letters in the microinstruction code indicates that those bits are not used but that the instruction addresses a corresponding register, i.e., B indicates the B register 31 of FIGS. 2 and 3A is addressed, C indicates an output channel is employed, P represents a page in a scratch pad memory, and so forth.

MPU INSTRUCTION LIST

I. Digit Instructions

LDA    The contents of the A Memory (addressed by the I Register) are shifted right 4 bits and the upper 4 bits loaded with the contents of the B memory (addressed by the concatenation of the N Register and the B Instruction bits).
$B(N,X_L), A(I)_U \rightarrow A(I)$
time: 1 clock pulse
Code: 1 1 1 1 B B B B

LDB    The contents of the B Memory (addressed by the concatenation of the N Register and the B Instruction bits) are loaded with the upper 4 bits contained in the A Memory (addressed by the I Register).
$A(I)_U \rightarrow B(N,X_L)$
time: 1 clock pulse
code: 1 0 1 1 B B B B

ADD    The contents of the A Memory (addressed by the I Register) upper 4 bits loaded with the sum of the upper 4 bits and the contents of the B Memory (addressed by the concatenation of the N Register and the B Instruction bits).
$B(N,X_L) + A(I)_U, A(I)_L \rightarrow A(I)$
time: 1 clock pulse
code: 1 0 0 1 B B B B

XOD    The contents of the A Memory (addressed by the I Register) upper 4 bits loaded with the "EXCLUSIVE OR" of the same 4 bits and the contents of the B Memory (addressed by the concatenation of the N Register and the B Instruction bits).
$B(N,X_L) \oplus A(I)_U, A(I)_L \rightarrow A(I)$
time: 1 clock pulse
code: 1 1 0 1 B B B B

ORD    The contents of the A Memory (addressed by the I Register) upper 4 bits loaded with the "OR" of the same 4 bits and the contents of the B Memory (addressed by the concatenation of the N Register and the B Instruction bits).
$B(N,X_L) \cup A(I)_U, A(I)_L \rightarrow A(I)$
time: 1 clock pulse
code: 1 1 0 0 B B B B

AND    The contents of the A Memory (addressed by the I Register) upper 4 bits loaded with the "AND" of the same 4 bits and the contents of the B Memory (addressed by the concatenation of the N Register and the B Instruction bits).
$B(N,X_L) \cap A(I)_U, A(I)_L \rightarrow A(I)$
time: 1 clock pulse
code: 1 1 1 0 B B B B

II. Character Instructions

INC    The contents of the B Memory (addressed by the concatenation of the N Register and the B Instruction bits) are incremented and the result placed in the A Memory (addressed by the I Register).
$B(N,X_L) + 1 \rightarrow A(I)$
time: 2 clock pulses
code: 1 0 1 0 B B B 0

ADC    The contents of the B Memory (addressed by the concatenation of the N Register and the B Instruction bits) are added to the A Memory (addressed by the I Register).
$B(N,X_L) + A(I) \rightarrow A(I)$
time: 2 clock pulses
code: 1 0 0 0 B B B 0

LCA    The contents of the A memory (addressed by the I Register) are loaded with the contents of the B Memory (addressed by the concatenation of the N Register and the B Instruction bits).
$B(N,X_L) \rightarrow A(I)$
time: 1 clock pulse
code: 1 0 1 0 B B B 1

LCB    The contents of the B Memory (addressed by the concatenation of the N Register and the B Instruction bits) are loaded with the contents of the A Memory (addressed by the I Register).
$A(I) \rightarrow B(N,X_L)$
time: 1 clock pulse
code: 1 0 0 0 B B B 1

INA    The contents of the A Memory (addressed by the concatenation of the N Register and the A Instruction bits) are incremented.
$A(N,X_L) + 1 \rightarrow A(N,X_L)$
time: 2 clock pulses
code: 0 0 0 0 0 A A 1

III. Literal Instructions

LDR    The contents of the A Memory (addressed by the I Register) are shifted right 4 bits and the upper 4 bits loaded with the R Instruction bits.
$X_L, A(I)_U \rightarrow A(I)$
time: 1 clock pulse
code: 0 0 1 1 R R R R

ADR    The contents of the A Memory (addressed by the I Register) upper 4 bits loaded with the sum of the same 4 bits and the R Instruction bits.
$X_L + A(I)_U, A(I)_L \rightarrow A(I)$
time: 1 clock pulse
code: 0 0 0 1 R R R R

IV. Input-Output Instructions

OUT    The contents of the A Memory (addressed by the I Register) and the C Instruction bits are outputed.
$A(I) \rightarrow OUT; X_L \rightarrow OUT$
time: 2 clock pulses
code: 0 1 1 1 C C C C

IN    The contents of the A Memory (addressed by the I Register) are loaded with the Input data. The C Instruction bits are outputed.
$IN \rightarrow A(I); X_L \rightarrow OUT$
time: 2 clock pulses
code: 0 1 1 0 C C C 0

SIO    The contents of the A Memory (addressed by the I Register) are shifted right one bit and the first and fourth bits are outputed and the upper bit is loaded from the Input. The C Instruction bits are outputed. If the N Instruction bit is zero, the process is repeated four times.
$A(I)_{1,4} \rightarrow OUTPUT; X_L \rightarrow OUT$
time: 1 or 4 clock pulses
code: 0 1 1 0 N C C 1

V. Memory Instructions

RED    The contents of the A and B Memories (addressed by the concatenation of the N Register and the A Instruction bits) are outputed as memory address. The contents of the A Memory (addressed by the I Register) are loaded with the Input memory data from the RAM. If the A bits are 11 the upper 8 address bits will be replaced by all ones.
$DATA\ [B(N,X_L), A(N,X_L)] \rightarrow A(I)$
time: 3 clock pulses
code: 0 0 0 0 1 A A 1

WRT    The contents of the A and B Memories (addressed

MPU INSTRUCTION LIST by the concatenation of the N Register and the A Instruction bits) are outputed as memory address. The contents of the A Memory (addressed by the I Register) are outputed as output memory data to the RAM. If the A bits are 11 the upper 8 address bits will be replaced by all ones.
    A(I) → DATA [B(N,X$_L$), A(N,X$_L$)]
    time: 3 clock pulses
    code: 0 0 0 0 1 A A 0

TRN    The contents of the A Memory (addressed by the I Register) and B Memory (addressed by the concatenation of the N Register and 0, 0, 1 bits are outputed as memory address. The contents of the A Memory (addressed by the I Register) are loaded with the Input Memory data from the ROM.
    DATA [B(N,X$_L$), A(I)] → A(I)
    time: 3 clock pulses
    code: 0 1 0 1 0 0 1 1

VI. Jump Instructions

JUP    The contents of the PR (Page) Register and the next ROM byte are loaded into the PC (Program Counter) Register.
    time: 2 clock pulses
    code: 0 1 0 1 0 0 0 0

JUK    If K is equal to one, do the same as in "JUP".
    time: 2 clock pulses
    code: 0 1 0 1 0 0 0 1

JF    If the F Flag is one, do the same as in "JUP".
    time: 2 clock pulses
    code: 0 1 0 1 0 0 1 0

JAR    If the "AND" of the A Instruction bits and the upper 4 bits of the A Memory (addressed by the I Register) are not zero, do the same as in "JUP".
    time: 2 clock pulses
    code: 0 1 0 0 A A A A JNO    If "NO" is one, do the same as in "JUP".
    time: 2 clock pulses
    code: 0 1 0 0 0 0 0 0

CAL    The contents of the PR (Page) Register and the PC (Program Counter) Register plus two are loaded into the A and B Memories (addressed by the concatenation of the N Register and the A Instruction bits). Then do the same as in "JUP".
    time: 2 clock pulses
    code: 0 0 0 0 0 0 A 0

RET    Load the PR (Page) Register and the PC (Program Counter) Register with the contents of the A and B Memories (addressed by the concatenation of the N Register and the A Instruction bits).
    time: 2 clock pulses
    code: 0 0 0 0 0 1 A 0

VII. Register Manipulation Instructions

LPR    Load the PR (Page) Register with the P Instruction bits. If the next instruction does not execute a Jump, the page register will be restored to its original value.
    time: 1 clock pulse
    code: 0 0 1 0 P P P P LDI    Load the I Register with N1, N0 and the I Instruction bits.
    time: 1 clock pulse
    code: 0 1 0 1 1 0 1 1

CF    Complement the state of the F Flag.
    time: 1 clock pulse
    code: 0 1 0 1 0 1 0 1

STR    Load the A Memory (addressed by the I Register) with the contents of K (carry), N Register and the I Register.
    time: 1 clock pulse
    code: 0 1 0 1 0 1 1 0

LDN    Load the N Register with the N Instruction bits.
    time: 1 clock pulse
    code: 0 1 0 1 1 1 N N ADK    If the next instruction is an ADD, ADR or ADC, the K (carry) Register will be added to the result. If the next instruction is LDR, LDA, LCA, XOD, ORD or AND, the K (carry) Register will be "EXCLUSIVE OR" with the least significant bit. If the next instruction is INC or INA, it increments only if the carry is equal to one. If the next instruction is JAR, it will test the lower 4 bits. If the next instruction is anything else, the ADK is ignored.
    time: 1 clock pulse
    code: 0 1 0 1 0 1 1 1

MOD    The lower 4 bits of the A Memory (addressed by the I Register) are ORed with the lower 4 bits of the next instruction before its execution.
    time: 1 clock pulse
    code: 0 1 0 1 0 1 0 0

FIG. 7 is a set of wave forms illustrating the time relation between clock cycles assigned to each of the unique processing capabilities. Each processing capability is given access to the shared elements of the system every fourth clock time. If a particular microinstruction requires more than one clock time or cycle, then the completion of that instruction must be delayed until the particular processing capability is again given access to the shared elements of the system.

In starting up the system of the present invention, the control logic 40 forces a starting address into program counter 36 (see FIG. 2) and page registers 37. The page registers are set to 0, 1, 2, and 3, for processors 0, 1, 2, and 3, respectively. Microprograms written for the processing capabilities must begin at these locations. No other registers are preset so it is necessary for the programmer to initialize N register 44, I register 43, and other necessary registers. Since the value in register 44 is used as a part of the value for I register 43, the N register must be initialized first.

EPILOGUE

The present invention, as described above, is a multiprocessor unit designed for implementation on a single MOS integrated circuit chip. To this end, the present invention employs a plurality of different sets of registers where each set represents a different processing capability and common elements which are shared by the different sets of registers in a time multiplex manner.

The shared elements include two scratch pad memories and an arithmetic logic unit as well as a control unit. The control unit may be a composite read only memory in the form of a matrix decoder or it may be a conventional read only memory in which control signals are stored to initiate the data transfer and arithmetic operations. Thus, the present invention employs horizontal microprogramming as that term is conventionally defined (see for example, Leibel Patent No. 3,766,532). In addition, the control unit is similar to a decoder for encoded microinstructions which are retrieved from a read only memory outside of the unit of the present invention. In this sense, the present invention is adapted for use with the combination of a vertical and horizontal microprogramming as those terms are conventionally defined (see Leibel, supra).

The eight special purpose registers which are dedicated to each processing cpability are formed out of 4-bit shift registers so as to permit a four-way time slicing among the processing capabilities. In this way, the unit of the present invention can execute independent concurrent processes.

One of the advantages of having four concurrent processing capabilities in a single MOS integrated circuit chip, as implemented in the present invention, is that they have free communication with each other at three different levels: through built-in circuitry, through the local scratch pad memories, and through main memory. Furthermore, the microprograms which drive the various processing capabilities can be shared by all the processing capabilities.

From the foregoing description, it will be apparent to those skilled in the art that various changes or modifications can be made in the embodiment as illustrated which changes will nevertheless not depart from the spirit and the scope of the invention as claimed.

What is claimed is:

1. A data processing system for executing a plurality of concurrent processes, said system comprising:
   a first memory to store sets of encoded microinstructions, each set of encoded microinstructions to execute a different process;
   a first plurality of sets of registers to temporarily store different sets of data corresponding to said different processes;
   a logic unit to perform logical operations on said data, said logic unit being coupled to said first plurality of sets of registers to receive data therefrom;
   a control unit including a control memory in which sets of control signals are stored in the form of unpacked microinstructions, said control memory being connected to said first memory to receive encoded microinstructions therefrom and to said first plurality of sets of registers and said logic unit to provide said sets of control signals thereto in response to the decoding of encoded microinstructions; and
   addressing means coupled to said first memory and including a second plurality of registers to store microinstruction addresses to select from said first memory, in a sequential order, one encoded microinstruction from each set of encoded microinstructions for transfer to said control unit to fetch sets of control signals in the form of an unpacked microinstruction and initiate logic operations to be performed on said different sets of data in said sequential order, each set of data being fetched from said first plurality of sets of registers in response to said sets of control signals.

2. A data processing system according to claim 1 wherein:
   individual ones of said registers within said second plurality of registers are coupled together for transfer of said microinstruction addresses therethrough in a sequential manner.

3. A data processing system according to claim 2 wherein:
   said coupled registers are formed of a plurality of sequential shift registers coupled in parallel.

4. A data processing system according to claim 1 wherein:
   said control memory is a read only memory.

5. A data processing system according to claim 4 wherein:
   said control memory comprises a semiconductor device matrix.

6. A data processing system according to claim 1 including:
   a third memory coupled to said first plurality of sets of registers, said third memory storing data to be processed by said system.

7. A data processing system according to claim 6 wherein;
   said first memory is a read only memory and said third memory is a random access memory.

8. A data processing system for executing a plurality of concurrent processes, said system comprising:
   a first memory to store sets of encoded microinstructions, each set of microinstructions to execute a different process; and
   a semiconductor chip, said chip including:
   a first plurality of sets of registers to temporarily store sets of data, each set of data to be processed by a different process;
   a logic unit connected to said first plurality of sets of registers to receive data and perform logical operations thereon;
   a control unit including a control memory in which sets of control signals are stored in the form of unpacked microinstructions, said control memory being connected to said first memory to receive encoded microinstructions therefrom and to said first plurality of sets of registers and said logic unit to provide said sets of control signals thereto in response to the decoding of encoded microinstructions; and
   addressing means coupled to said first memory and including a second plurality of registers to store microinstruction addresses to select from said first memory, in a sequential order, one encoded microinstruction from each set of encoded microinstructions for transfer to said control unit to fetch sets of control signals in the form of an unpacked microinstruction and activate said logic unit to receive and perform logic operations upon said data according to said sequential order, each set of data being fetched from said first plurality of sets of registers in response to said sets of control signals.

9. A data processing system according to claim 8 wherein:
   said semiconductor chip is an MOS device.

10. A data processing system according to claim 8 wherein:
    said registers are formed of unipolar field effect transistors.

* * * * *

UNITED STATES PATENT OFFICE
CERTIFICATE OF CORRECTION

Patent No. 3,980,992     Dated    September 14, 1976

Inventor(s) Bernardo Navarro Levy and David Chin-Chung Lee

It is certified that error appears in the above-identified patent and that said Letters Patent are hereby corrected as shown below:

Col. 1, line 31, change "processing system" to read --processing systems--.
Col. 3, line 14, change "the processing capabilities" to read --the processing capabilities in--.
Col. 4, line 58, change "the other processing" to read --the other three processing--.
Col. 5, line 55, change "this done not match" to read --this does not match--.
Col. 6, line 61, change "nation A2" to read --nations A2--.
Col. 8, line 22, change "signal KI" to read --signal $\overline{KI}$--.
Col. 13, line 2, change "cpability" to read --capability--.

Signed and Sealed this

Thirtieth Day of November 1976

[SEAL]

Attest:

RUTH C. MASON
Attesting Officer

C. MARSHALL DANN
Commissioner of Patents and Trademarks